United States Patent [19]

Washbourne

[11] 3,939,002

[45] Feb. 17, 1976

[54] METHOD OF MAKING A CERAMIC FIBER REPLICA OF A BODY OF RETICULATED ORGANIC FOAM

[75] Inventor: Colin Washbourne, Birmingham, England

[73] Assignee: Foseco International Limited, Birmingham, England

[22] Filed: Oct. 23, 1974

[21] Appl. No.: 517,253

[30] Foreign Application Priority Data

Nov. 12, 1973 United Kingdom............... 52449/73

[52] U.S. Cl.................. 106/41; 106/65; 252/477 R; 264/44; 264/321
[51] Int. Cl.$^2$..................... C04B 35/80; C04B 35/84
[58] Field of Search ..... 106/41; 252/477 R; 264/44, 264/321

[56] References Cited
UNITED STATES PATENTS

| | | | |
|---|---|---|---|
| 3,171,820 | 3/1965 | Volz............................... | 264/321 X |
| 3,275,497 | 9/1966 | Weiss et al....................... | 106/41 X |
| 3,510,323 | 5/1970 | Wismer et al.................... | 106/41 |
| 3,616,841 | 11/1971 | Walz............................... | 264/44 X |
| 3,776,987 | 12/1973 | Grimes et al.................... | 106/41 X |
| 3,833,386 | 9/1974 | Wood et al...................... | 106/41 |
| 3,843,561 | 10/1974 | Sobel.............................. | 252/477 X |
| 3,845,181 | 10/1974 | Ravault.......................... | 264/44 |
| 3,907,579 | 9/1975 | Ravault.......................... | 106/41 |

FOREIGN PATENTS OR APPLICATIONS

916,784   1/1963   United Kingdom................... 106/41

Primary Examiner—Helen M. McCarthy
Attorney, Agent, or Firm—Cushman, Darby & Cushman

[57] ABSTRACT

The invention provides a porous refractory ceramic material having a high surface area per unit volume, a high resistance to sudden temperature variations and a low resistance to fluid flow. The material is a ceramic replica of a body of reticulated organic foam in which the ceramic consists essentially of fibrous material. Any non-fibrous particulate matter present is in an amount which makes no significant contribution to the strength of the body. The material is made by impregnating a body of reticulated organic foam with a slurry of finely-divided inorganic fibres, and drying and firing the thus-impregnated body. The material is of value as a catalyst support and as a facing element of burner assemblies.

6 Claims, No Drawings

METHOD OF MAKING A CERAMIC FIBER REPLICA OF A BODY OF RETICULATED ORGANIC FOAM

This invention relates to the production of porous refractory ceramic materials having a high surface area per unit volume, a high resistance to sudden temperature variations and a low resistance to fluid flow. Such materials are of value for applications such as supports for catalysts and as facing elements of burner assemblies.

Means of producing a ceramic replica of an organic foam are described in our copending U.S. applications Ser. Nos. 318,764, 317,088, and 319,849 now abandoned.

Finely-divided ceramic particles, or finely-divided particles of materials which when heated to an appropriate temperature will react to form a ceramic, are dispersed in a suitable liquid medium to form a slip or slurry, which is then used to coat the surfaces of an organic foam; the resulting structure is then dried and fired.

Our copending U.S. application Ser. No. 465,143 discloses means of providing a reticulated ceramic body prepared in the foregoing manner with a coating of ceramic fibres on its internal surfaces, thereby significantly increasing its surface area per unit volume to give a body of enhanced value as a catalyst support.

The materials described above are of considerable value in applications where they are operating in an environment of more or less even temperature. However, when such materials are used in an environment involving high and fluctuating temperatures, for example, in a burner or as a catalyst support, they may break up unless they are constructed from a ceramic system having a high resistance to thermal shock. Examples of such ceramic systems are glass-ceramics such as magnesia-alumina-silica with titania as nucleating agent or lithia-alumina-silica with titania and/or zirconia as nucleating agent(s), and such systems can be difficult to fabricate successfully into cellular and reticular forms.

The object of the present invention is to provide a tough, resilient, reticulated ceramic without any of the foregoing disadvantages.

According to the present invention there is provided a ceramic replica of a body of reticulated organic foam wherein the ceramic consists wholly or substantially of fibrous material, any non-fibrous particulate matter present making no significant contribution to the strength of the body.

The non-fibrous particulate matter may be present accidentally, for example, as "shot" in the fibres, or as a deliberate addition, for example, in the form of particles of catalytic material. The ceramic fibres may be bonded together by heating the body to an appropriate temperature or by means of a suitable inorganic refractory binder dispersible or soluble in a liquid medium.

According to a further feature of the present invention there is provided a method of making a ceramic replica in accordance with the invention, which method comprises impregnating a body of reticulated organic foam with a slurry of finely — divided inorganic fibres, and drying and firing the so — impregnated body.

The fibrous ceramic used in this invention may be, for example, glass wool, slag wool, asbestos, silica fibres, aluminosilicate fibres, alumina fibres, zirconia fibres or glass-ceramic fibres. Aluminosilicate fibre is preferred on account of its refractoriness, relative cheapness and absence of toxicity. The fibre length should naturally not be such that the fibres cannot permeate into the foam body. Preferably, the average fibre length is at most 50% of the diameter of the cells of the foam. The soluble inorganic refractory binder may be, for example, aluminium hydrogen orthophosphate, aluminium chromium orthophosphate, a suitable chromium salt, zirconium hydroxynitrate, zirconium hydroxy-acetate, phosphoric acid, tetraethoxysilane ("ethyl silicate"), aluminium hydroxychloride, or a colloidal oxide hydrosol e.g. a colloidal alumina hydrosol or a colloidal silica hydrosol. A silica hydrosol is preferred on account of its relative cheapness and its ability to form an effective bond at a low temperature which bond is nevertheless maintained to elevated temperatures.

There are various means by which the method of this invention may be carried out. For example, a reticulated polyurethane foam may simply be impregnated with a slurry of finely-divided inorganic fibres, and the so-impregnated foam subsequently dried and fired. However, this may be attended with some difficulty since the urethan is hydrophobic and the slurry does not adhere well to it.

The improved methods described in our copending applications Ser. Nos. 318,764, 317,088, 319,849 may also be adopted for use with fibre slurries.

In a preferred embodiment, a reticulated polyester polyurethane foam is pretreated with a base, preferably a volatile organic base, for example, monoethanolamine. Separately, a slurry is prepared by dispersing short ceramic fibres by means of a high-shear mixer in an aqueous solution of a modified polyvinyl polycarboxylic acid of a type whose solutions undergo a sharp viscosity increase when neutralised. Surplus base is then removed from the polyurethane foam, preferably by means of a centrifuge, and the urethane body is then plunged into the slurry. The presence of the coating of base produces gelation of the polymer solution in the immediate vicinity of the strands of the organic reticulum, thus entrapping a coating of ceramic fibres onto the strands. Surplus slurry is then expelled by centrifuging. The resulting body is then dried, and may subsequently be repeatedly dipped into the slurry, centrifuged and dried until the desired coating thickness is built up. In general, it is not necessary to employ the base again during these subsequent dips.

The soluble inorganic binder may be incorporated in the slurry, but because the pH changes of the process are critical and such binders are commonly either strongly acid or strongly basic, it is preferably applied to the body formed as described by dipping or other suitable means, preferably before firing but after drying. In this context, it should also be noted that the pH of the fibre slurry will tend to rise owing to contamination from the base carried into it on the polyurethane foam, hence periodic pH correction with a volatile acid (e.g. HCl) will be necessary to prevent gelation of the slurry.

The body is then heated to a suitable temperature in an oxidising atmosphere to remove the polyurethane and other organic matter and develop the bond; a temperature of 500°C or higher is appropriate. The body thus formed may be put directly into service or further strengthened by further applications of dispersions or solutions of inorganic binders followed by heating to a temperature suitable to develop the bond, or in some instances this further strengthening may be achieved by heat treatment alone.

Obviously in such a process as this there is a risk that the slurry fibres will become filtered out on the surface of the reticulated polyurethane shape and fail to penetrate to any significant extent to the interior. This risk is avoided by ensuring that the fibre length is sufficiently short and the fibre concentration sufficiently low for penetration to take place, and these factors are dependent on the cell size of the organic foam. For example, in order successfully to impregnate a reticulated foam having a cell count of from 4 – 10 pores per linear centimetre, a maximum fibre length of 0.5mm is preferred, and a maximum fibre concentration in the slurry of 5% w/w. With certain commercial grades of ceramic fibre, it may be necessary to continue the high-shear mixing until the length of the fibres is sufficiently reduced. The length to diameter ratio of the fibres should be in the order of 10 to 1 or greater.

It is also preferable to use a rigid type of reticulated polyurethane foam. At the stages where surplus slurry is removed by centrifuging, a non-rigid foam will compress, and after removing from the centrifuge it can be observed that the cell spaces contain small free agglomerates of fibre which have become detached from the polyurethane strands.

The following examples will serve to illustrate the invention:-

EXAMPLE 1

A slurry was made by dispersing 5 g of aluminosilicate fibres of maximum length 0.5mm in 95g of a 0.25% aqueous solution of a modified polyvinyl polycarboxylic acid by means of a mixer fitted with a high-shear head.

A piece of rigidised polyurethane reticular foam having 4 to 5 pores per linear cm was dipped in a 50% aqueous solution of monoethanolamine then centrifuged to remove excess solution, and dipped in the fibre slurry prepared as above. The piece of foam was then removed, centrifuged to remove excess slurry, and dried in a current of hot air. Thereafter, the piece of foam was again dipped in the fibre slurry, centrifuged and dried a further two times.

The piece of foam was then dipped into a colloidal silica hydrosol containing 30% silica solids w/w, drained, and dried in a hot air stream. Finally the piece was heated to 500°C in an electric muffle furnace in an oxidising atmosphere until a white coloration was achieved indicating that all organic matter had been burnt off.

The resulting fibrous reticular ceramic had a bulk density of 0.15 g/cm³, showed no significant shrinkage from the size of the original organic foam, and was resistant to repeated impingements of a roaring gas flame, being allowed to cool between each impingement.

EXAMPLE 2

A fibrous reticular ceramic prepared as in Example 1 was dipped in a 40% solution of aluminium hydroxychloride, dried and fired at 800°C for 1 hour. A body resulted which was stronger than that produced in Example 1, and equally resistant to thermal shock.

EXAMPLE 3

A piece of reticulated polyester polyurethane foam having 4 to 5 pores per linear cm was cut to the desired shape and dipped in a 50% aqueous solution of a 95% polyvinyl acetate- 5% polyvinyl chloride copolymer, centrifuged free from excess polymer solution, and dried at 110°C in an oven. A rigidised foam resulted. (It is a particular advantage of this example that the rigidised foam is thermoplastic and can be made to take up a desired shape when heated to 110°C or therabouts).

A slurry was prepared by dispersing aluminosilicate fibres of length about 0.5 mm in a colloidal silica hydrosol containing 30% w/w of silica solid. One part by weight of fibres being mixed with 99 parts by weight of hydrosol. The treated urethane foam was then dipped in this slurry, surplus slurry centrifuged away, and the shape dried at 110°C.

The process described in the preceding paragraph was repeated until a sufficient thickness of fibrous matter had built up on the strands of the reticulated foam (at least five repeats).

The body was then fired in air to 800°C, maintained at that temperature for 4 hours, and allowed to cool.

A reticular fibrous ceramic body resulted having excellent resistance to thermal shock, a density of 0.36 g/cc, a cold crushing strength of 32 p.s.i. and which was refractory to 1200°C.

A valuable feature of this invention illustrated by this example is that the body does not shrink during the firing at 800°C and, therefore, the fired shape can be produced with accuracy.

We claim:

1. A ceramic replica of a body of reticulated organic foam wherein the ceramic consists wholly or substantially of fibrous material, the average fiber length of the fibrous material being at most 50% of the diameter of the cells of the foam, and any non-fibrous particulate matter present making no significant contribution to the strength of the replica body.

2. A ceramic replica as recited in claim 1 wherein the fibrous material is aluminosilicate fiber.

3. A ceramic replica as recited in claim 1 wherein the length to diameter ratio of the fibers of the fibrous material is at least 10:1.

4. A method of making a ceramic replica, consisting wholly or substantially of fibrous material, of a body of reticulated organic foam comprising the steps of
impregnating a body of reticulated organic foam with a slurry of finely-divided inorganic fibers, the average fiber length of the fibrous material being at most 50% of the diameter of the cells of the foam, and any non-fibrous particulate matter present making no significant contribution to the strength of the body,
drying the so-impregnated body, and
firing the so-impregnated and dried body at a temperature of at least 500°C.

5. A method as recited in claim 4 comprising the further step of introducing a colloidal oxide hydrosol binder prior to firing to bond the fibrous material to coherent shape.

6. A method as recited in claim 4 wherein the foam is a polyurethane foam and wherein the slurry contains a modified polyvinyl polycarboxylic acid, and comprising the further step of treating the foam with monoethanolamine prior to impregnation of the foam.

* * * * *